United States Patent [19]

Palmer

[11] Patent Number: 5,305,389
[45] Date of Patent: Apr. 19, 1994

[54] PREDICTIVE CACHE SYSTEM
[75] Inventor: Mark L. Palmer, Hollis, N.H.
[73] Assignee: Digital Equipment Corporation, Maynard, Mass.
[21] Appl. No.: 753,096
[22] Filed: Aug. 30, 1991
[51] Int. Cl.$^5$ .................................................. G06K 9/00
[52] U.S. Cl. ........................................ 382/1; 382/14; 395/425
[58] Field of Search .................... 382/1, 14, 15, 41; 395/600, 250, 425, 725; 365/230.01, 230.08

[56] References Cited

U.S. PATENT DOCUMENTS

| | | | |
|---|---|---|---|
| 4,860,197 | 8/1989 | Langendorf et al. | 364/200 |
| 4,943,908 | 7/1990 | Emma et al. | 364/200 |
| 4,980,823 | 12/1990 | Liu | 364/200 |
| 5,014,327 | 5/1991 | Potter et al. | 382/14 |

OTHER PUBLICATIONS

"Prefetching Using a Pageable Branch History Table", *IBM Technical Disclosure Bulletin*, vol. 28, No. 8, Jan. 1986.
"Using a Small Cache to Hedge for a BHT", *IBM Technical Disclosure Bulletin*, Vo. 28, No. 4, Sep. 1985.
"Using a Branch History Table to Prefetch Cache Lines", *IBM Technical Disclosure Bulletin*, vol. 22, No. 12, May 1980.
M. E. Ulug et al., "A Database I/O Server with a Learning Expert System", General Electric Company, Corporate Research and Development, *Information Sciences 48*, 53-74 (1989).
H. Wedekind et al., "Prefetching In Realtime Database Applications", presented at ACM SIGMOD, Washington, May 1986.
Hong-Tai Chou et al., "An Evaluation of Buffer Management Strategies for Relational Database Systems," Proceedings of VLDB 85, Stockholm, pp. 127-141, Computer Sciences Department University of Wisconsin.
Rajiv Jauhari et al., "Priority-Hints: An Algorithm for Priority-Based Buffer Management," Madison, Wis., 53706, *Proceedings of the 16th VLDB Conference*, Brisbane, Australia, 1990, pp. 708-721.
Rafael Alonso, "Data Caching Issues in an Information Retrieval System," ACM Transactions on Database Systems, vol. 15, No. 3, Sep. 1990, pp. 359-384.
Klaus Kratzer et al., "Prefetching A Performance Analysis," *Information Systems*, vol. 15, No. 4, pp. 445-452, Copyright 1990 Pergamon Press plc.
Alan J. Smith, "Sequentiality and Prefetching in Database Systems," *University of California-Berkeley, ACM Transactions on Database Systems*, vol. 3, No. 3, Sep. 1978, pp. 223-247.
Juan Rodriguez-Rosell, "Empirical Data Reference Behavior in Data Base Systems," *Computer*, Nov. 1976, pp. 9-13.
Michael Hammer, et al., "Acquisition and Utilization of Access Patterns in Relational Data Base Implementation," MIT Laboratory for Computer Science, 545 Technology Square, Cambridge, Mass. 02139, pp. 292-313.
Bahram Niamir, "Attribute Partitioning in a Self-Adaptive Relational Database System," Laboratory for Computer Science, MIT, 545 Technology Square, Cambridge, Mass. 02139.
Palmer, Mark & Zdonik, Stanley B., Technical Report, *Fido: A Cache That Learns to Fetch*, Published by Brown University, Computer Science Dept., Providence, R.I.

*Primary Examiner*—Leo H. Boudreau
*Attorney, Agent, or Firm*—Hamilton, Brook, Smith & Reynolds

[57] ABSTRACT

Prefetches to a cache memory subsystem are made from predictions which are based on access patterns stored by context. An access pattern is generated from prior accesses of a data processing system processing in a like context. During a training sequence, an actual trace of memory accesses is processed to generate unit patterns which serve in making future predictions and to identify statistics such as pattern accuracy for each unit pattern. In a replacement list, prefetched objects are included at the head of the list. Within a prefetch, objects are listed by order of expected time of access, with alternatives at predicted times of access. When an object is used, it is moved to the head of the list and any prefetched alternatives to that object, indicated by like time marks, are moved to the tail of the list. Alternatives may be listed according to degree of match of a current access pattern and a stored access pattern and by prior accuracy of the unit pattern. A server includes a demand access queue which preempts fetches of objects identified by a prefetch queue.

41 Claims, 9 Drawing Sheets

PREDICTIVE CACHE SYSTEM

RELATED PAPERS

Early implementations of the present invention are presented in the following papers:

Palmer and Zdonik, *Predictive Caching*, Technical Report CS-90-29, Brown University, November 1990; and Palmer and Zdonik, *Fido: A Cache That Learns to Fetch*, Technical Report CS-91-15, Brown University, February 1991.

BACKGROUND OF THE INVENTION

Caching of data in fast memory is a technique widely used in computer systems to improve performance. Caching is usually done between levels of a memory hierarchy, where data must be transferred from slower, secondary storage "up" to faster, primary storage for use. The transfer of data from slow to fast storage usually happens automatically and invisibly to the application requesting data. The cache algorithm reads requested data from slow memory if it is not in cache, causing the application to wait, or immediately responds if the requested data is in cache by returning the fast memory address of the data. The terms paging and buffering are also used to refer to data caching.

One example of a data cache found in almost every operating system is the paging mechanism for virtual memory management. In this case, data objects are program pages, and the cache is a "working set" of pages kept in main memory when the process is executing. Another common use of data caching is in database or file systems, particularly client-server systems that cache data at the client. Much work on data caching has been done and can be found in operating systems or database textbooks. Two major aspects of any cache management algorithm are its replacement policy and prefetch policy, which both affect efficiency of the cache.

Since a cache is kept full, any new data object transferred from secondary storage to the cache must replace some other object. A cache management algorithm chooses a data object for eviction according to some replacement policy. Many replacement policies have been studied in computer science literature. Most replacement policies in commercial systems are variations or approximations of the Least-Recently-Used (LRU) policy, which stipulates that the object evicted is that object which was used least recently. In the literature, such policies are often compared to a proven optimal policy known as OPT. OPT stipulates that the object evicted from cache is that object which is used furthest in the future. However, this requires perfect and complete knowledge of the future access sequence, so OPT is therefore considered impossible to implement.

Cache management either operates by demand fetching, in which case all objects must be requested by the application program before being brought into cache, or it implements some policy for prefetching objects. The most common prefetch policy is to cluster objects that are often used together near each other on secondary storage, and then fetch an entire cluster of objects into cache when any object in the cluster is requested. Defining how objects should be clustered is considered a relatively difficult problem to solve automatically, and any given clustering necessarily favors some access patterns over others. A prefetched cluster often includes many objects that do not get used, but includes no information to guide the replacement policy in choosing between unused objects for eviction: A second prefetch policy sometimes used is to augment the cache manager with code that uses knowledge of application semantics to prefetch data. For example, an application that displays 3-D spatial data might implement a prefetch heuristic that fetches objects nearest the requested object in a cartesian coordinate system.

SUMMARY OF THE INVENTION

Predictive caching is a method of increasing the performance of applications that retrieve data from a slower secondary store and cache it in fast memory during a session. The predictive cache recognizes and learns access pattern regularities that appear over time within a usage context, exploiting these regularities to anticipate movement of data across memory boundaries, particularly I/O boundaries. The ability to predict the approximate immediate future in detail allows cache utilization to be more efficient and reduces and potentially eliminates the times an application waits for data not present in cache. The methods of learning and predication of the present invention are general purpose in that the pattern recognition component does not require information about application semantics or data structure to operate.

In accordance with the present invention, a data processing system includes a predictive cache memory subsystem which allows objects accessed from secondary memory to be stored in cache memory. The subsystem includes a pattern memory for storing patterns of access to data objects. The stored patterns are generated by analysis of prior object accesses when the data processing system is processing in a like context. A prefetcher includes a predictor which responds to a current access pattern during operation of the data processing system to predict, from like object access patterns stored in pattern memory, accesses to objects. The predicted objects are prefetched and stored in cache memory. Though objects may take any form, such as in virtual memory management in an operating system, the invention has particular application to object oriented databases (OODBs).

Preferably, predictions are made based on the order of predicted access times of objects within a current access pattern relative to stored access patterns. Patterns of different contexts are stored separately in pattern memory. Context may be identified by user, application, and database. Context may be further specified by a user or application.

Preferably, the system comprises a trainer for generating access patterns stored in pattern memory from traces of accesses recorded during processing of the data processing system. The trainer may generate statistical information for the stored access patterns to indicate ability of patterns to contribute to system speed up. The statistics may include accuracy of prediction. The trainer may adapt to accesses of the data processing system to delete patterns from pattern memory which do not contribute sufficiently to system speed up. The patterns may be stored in pattern memory as unit patterns and the trainer may delete or reduce lengths of unit patterns in pattern memory based on accuracy of predictions from the unit patterns. The trainer may initiate new patterns in pattern memory from overlapping single occurrences of unit patterns in an access trace. The overlapping unit patterns allow for the possibility of eliminating all faults in cache memory.

Where the patterns are stored in pattern memory as unit patterns, the predictor compares a current access pattern to a sample length of unit patterns. The prediction is formed from the remaining length of selected unit patterns. The predictor may dynamically control sample length and/or lengths of predicted object accesses and/or match radius to balance efficiency of prediction against accuracy. A prediction may be formed from a combination of access patterns stored in pattern memory.

The cache memory subsystem evicts objects from cache memory by order of priority, and objects which are prefetched may be given priority by the predictor. Prefetched objects are initially given high priority to remain in cache memory relative to any other objects in cache. The predictor may arrange predicted objects by order of expected time of access. At each time of expected access, alternatives may be listed. The alternatives may be ordered by degree of match of a current access pattern to a stored access pattern and/or by accuracy of past predictions for the stored access patterns. When an object is used, that object is then given high priority, and alternatives to that object are given low priority. Priority order may be determined by an ordered list of objects residing in cache memory.

The data processing system may include a primary cache which receives objects from the predictive cache memory subsystem. In that case, objects evicted from the primary cache are received by the predictive cache memory subsystem.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Because of structure in data and determinism in programs, access within an individual context, such as defined by database, application program, and user, can be predicted dynamically irrespective of inherent or prearranged locality of reference. In accordance with the present invention, a predictive cache automatically recognizes and exploits patterns that emerge over time within each access context to provide accurate prefetching under mixed access paradigms.

Predictive caching is most useful to distributed applications that are data intensive with high read/write ratios, use navigational access patterns that imply different data clusterings, create and delete medium-granularity objects at a rate slow enough to permit tracking of changes, and preserve some degree of object identity.

Figure 1:
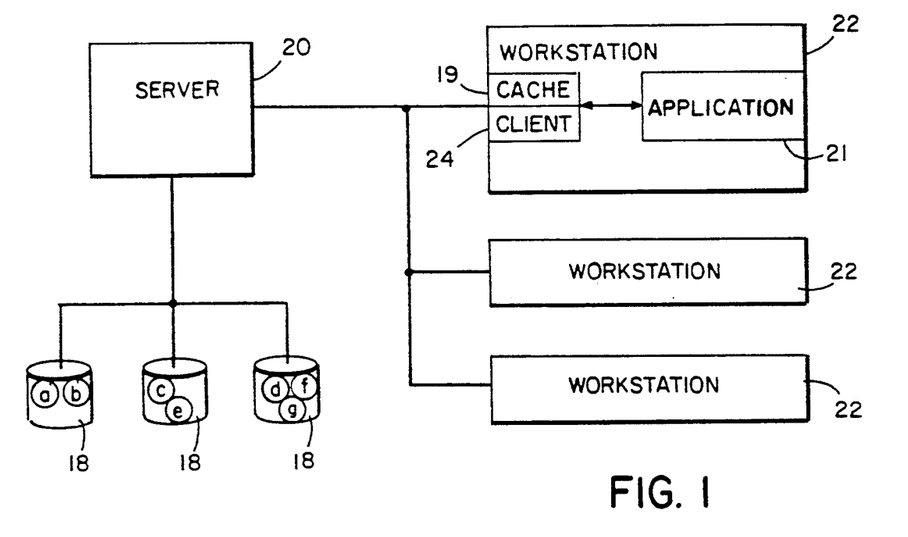
FIG. 1 is a block diagram of a preferred environment to which the present invention is applied.

In general, CAD applications have many of these characteristics. Object oriented data bases (OODBs) support data sharing between such applications and maintain object identity. As illustrated in FIG. 1, predictive cache is particularly suited to operate in OODB systems where applications 21 in workstations 22 retrieve objects from secondary storage 18 through a server 20 and cache them in local memory 19. This is known as a workstation-server, or interpreter storage manager architecture. As particular examples, the predictive cache ma be added to the Observer/ENCORE system [M. Fernandez, A. Ewald, S. Zdonik, "Observer: A Storage System for Object-Oriented Applications," Tech Report CS90-27, Brown University, November 1990] or to the Objectivity Systems by Objectivity Inc. The primary components of the typical architectures are the database server 20 and the client 24. A client embodying the present invention serves as both cache manager and prefetcher. As a prefetcher it includes an object access predictor as described below.

The server manages access to database secondary storage. The server maintains strong object identity which aids predictive caching—the preservation of identity simplifies recognition of reoccurring parts of an access pattern over time. Object identity may be provided via an external unique identifier (UID) that acts as an immutable handle for an object.

The server read message supplies a list of UIDs to the server, which gets the identified objects from disk or a server-managed buffer and returns them to the requester. A server may facilitate prefetching through extensions of the basic read function. A requester may mark reads for either demand or prefetch processing. The server would then prevent an outstanding prefetch request from delaying other requests by providing a pre-emptive read operation for demand requests and servicing them before other reads.

Systems may allow users to cluster objects. The server returns a cluster when any object in the cluster is referenced, thus clusters are the usual unit of server-client communication. The client can disable cluster prefetching, which causes the server to return the set of objects in a request as the unit of network communication.

A workstation application 21 interfaces to the server 20 via the client component 24 which acts as an interpreter, mapping the data model used by the application onto operations understandable by the server. The client implements object type semantics, executing methods and enforcing encapsulation, and is typically bound into the applications's image. The client also validates cache objects and supports other database functions related to persistence and distribution, but the operation of these is unrelated to the prefetch mechanism. The salient function of the client is that it allows the application to reference objects by UID, without knowledge of how or where objects are stored. The client ensures that referenced objects are ferried between the server and the application's local memory transparently. Clients take various approaches to translating object references to memory addresses. They often use some form of Resident Object Table (ROT) to obtain a pointer to the object's location in memory.

The client isolates access patterns according to access contexts. A prophet of the present invention provides context identifiers (CIDs) as a handle to associate patterns generated by the same source. By identifying pattern memory by context, the amount of information stored at the work station during a particular process is substantially reduced. The reduced pattern memory size increases the accuracy of predictions with fewer resources. By default, the system uses CIDs to indicate the combination of user and application that generates a particular access sequence to a particular database, but context may be based on any limiter may be controlled further by the programmer. For example, an application might provide one function that graphically displays a circuit design, and another function that allows ad hoc queries. The access pattern of the display function might be very predictable, allowing efficient learning, while sequences generated by ad hoc queries could be arbitrary and difficult to learn. A programmer might establish different CIDs corresponding to these two functions, even when the same user invokes them. A designer can use CIDs and knowledge of an application to "focus attention" of the prophet, thus increasing prediction accuracy and reducing resource requirements for prediction at any given time.

Figure 2:
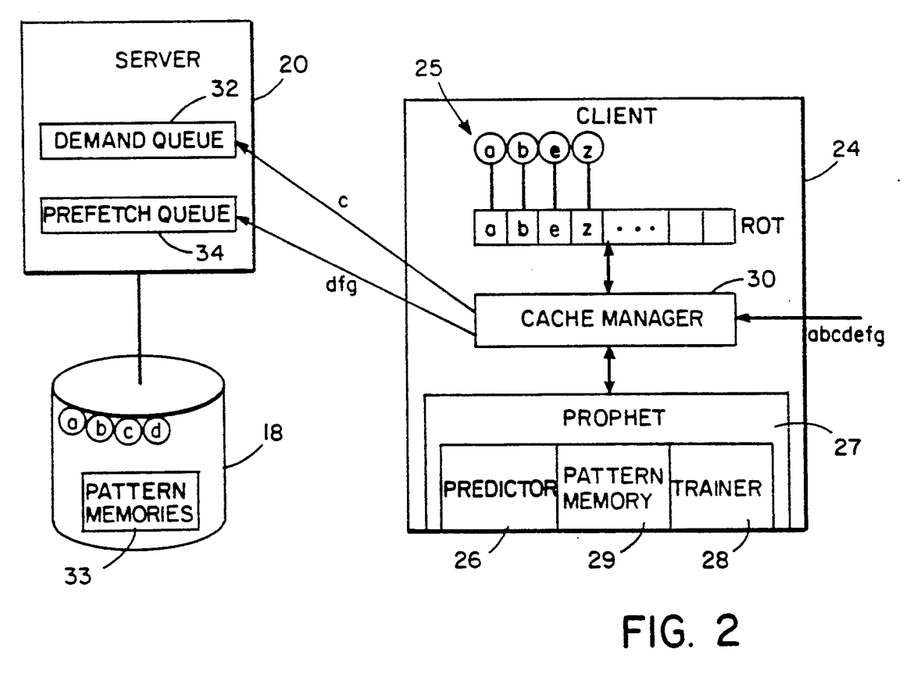
FIG. 2 is a block diagram illustrating the client and server of FIG. 1 in greater detail.

The predictive cache subsystem can be configured as a separate service or as part of the client image. As illustrated in FIG. 2, a portion 25 of the client cache is allocated to the predictive cache. The cache manager 30 interfaces to the prophet 27 to decide what to prefetch and the order in which to replace cached objects. The prophet has two primary modes of operation: prediction an training.

Given a sample of the latest sequence of access, a predictor 26 refers to pattern memory 29 to predict which accesses will occur next. An individual prediction may indicate that alternate sequences are anticipated by arranging identifiers according to expected order and likelihood of access.

In training mode, a trainer 28 learns access patterns over time and becomes increasingly better at prediction, until it reaches a stable state where learning ceases. This state may be reached because the system is not encountering any new information or changes in access pattern, or because it has exceeded user-specified resource limits. The access pattern information for a single access context is known as a pattern memory. The system stores each pattern memory between sessions in secondary storage at 33.

FIG. 2 shows how the predictive cache subsystem operates with the server. UIDs are represented as letters and objects are represented as circles about UIDs. As an application session begins, the pattern memory 29 for the particular access context is loaded from secondary storage 18 into the prophet 27. The application generates a sequence of references, illustrated here as a sequence of references to objects a b c d e f g. The cache manager 30 looks to the resident object table ROT for the objects resident in cache and, for residing objects, converts the UIDs to object memory addresses via the ROT. In this example, objects a b and e initially reside in cache and are indicated in the ROT. Thus, references to a and b return to the application program pointers to those objects in the cache. Since the next accessed object c is not in the cache, the client issues a pre-emptive demand read to the server. The UID c is enqueued in the demand queue 32 which is given priority by the server over any prefetches. The server then locates and accesses the object c in secondary storage 18 in order to return the object to the client 24.

With each UID request from the application, the predictor 26 monitors the current access sequence. When it recognizes the start of a known pattern from the pattern memory, it generates a prediction. In this case, for example, from the sequence a b c the predictor may predict a completion of the pattern d e f g. Since e is already in cache, the cache manager 30 starts a prefetch request for the remaining predicted objects d f and g. Those UIDs are entered in the prefetch queue 34 for processing by the server 20. Though the UIDs in the demand queue 32 are given priority, the server may look to different devices for the different objects, so the prefetched objects may actually be accessed in parallel with the demand objects.

As will be discussed in greater detail below, with a prefetch request, promises for the request objects are entered into the ROT. Any subsequent requests for the promised objects block until the prefetch request arrives and updates the promises, converting them to regular ROT entries.

Figure 3:
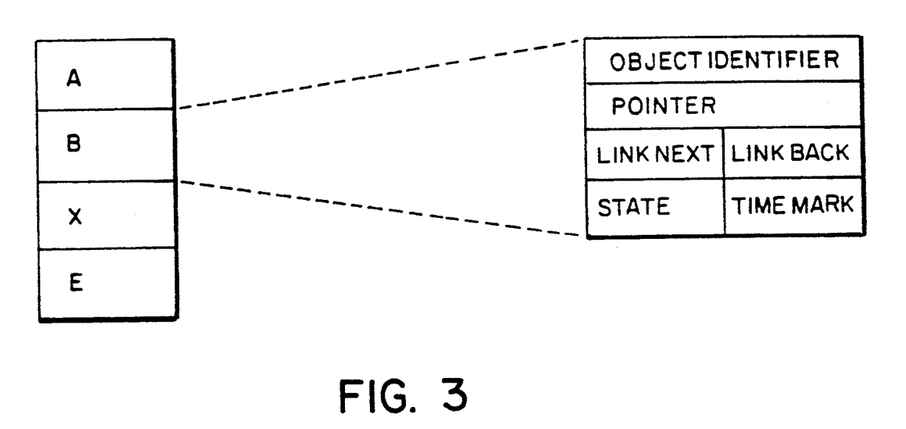
FIG. 3 illustrates the data structure of the resident object table (ROT) of FIG. 2.

The data structure of the ROT is illustrated in FIG. 3. The object identifier is the UID. A pointer to the address of the object in cache memory is provided. If the object is not yet in cache memory but is promised, the pointer is to a wait flag. Elements of the ROT are arranged in a list by order of replacement priority by the pointers link next and link back. By changing these pointers, priority of an object within cache and thus the order by which objects are rejected from cache are changed. The state field indicates one of three states: promised (a read is in progress), prefetch (a prefetched object is resident in cache but as yet is unreferenced) and referenced (an object in cache has been referenced by the application program). As discussed in greated detail below, a time mark, which may be a single bit, identifies the object with a group of alternative predictions which are listed contiguously in the replacement list. Although ordering by the list pointers within the ROT is the preferred mechanism, other mechanisms such as a time stamp mechanism may be utilized.

Figure 4:
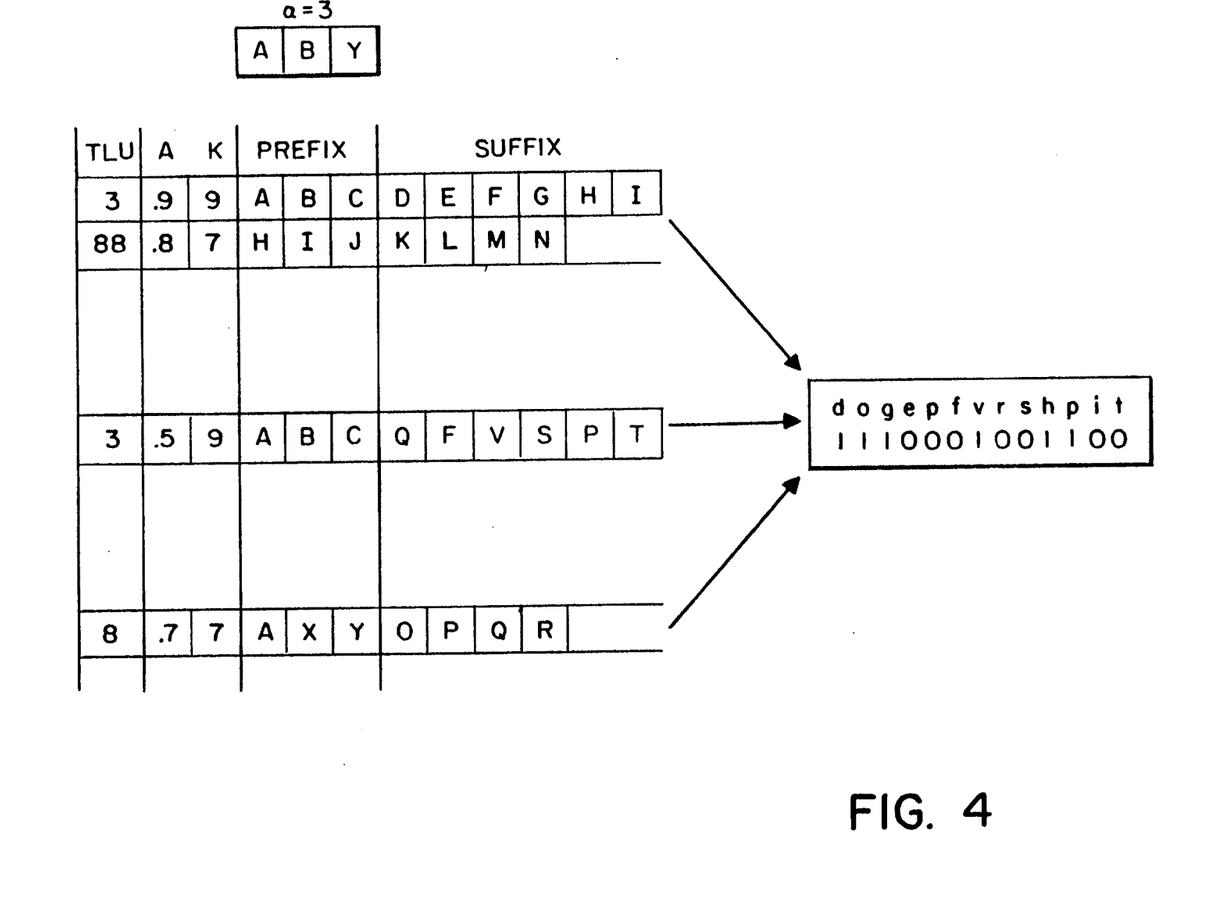
FIG. 4 illustrates data stored in pattern memory and the formation of a prediction therefrom.

FIG. 4 illustrates a pattern memory and a prediction formed from several unit patterns from memory. To implement a high speed yet reliable prediction strategy, patterns are stored in memory as units with a maximum pattern length k of, for example, fifty identifiers, though only nine are shown in the figure. In one implementation two thousand entries are allowed in the pattern memory for a context. In locating matching patterns, a sample window of current access objects is compared to the first objects of each pattern of pattern memory. For example, the input sample window may be set at 3 (alpha=3). As illustrated in FIG. 4, the current access pattern a b y is compared to the first three objects, or prefix, of each pattern stored in the memory. Patterns need not demonstrate a complete match to be selected for possible prediction. Rather, the match must be within a radius R. Patterns having fewer than R mismatching elements aligned with the sample are inside the radius. Thus, in the example shown, with a radius of one, the sample a b y would match to the first third and fourth patterns. Preferably, the order of accesses is significant in determining a match.

In the present embodiment, to search for the matching patterns, the predictor performs a binary search on the first column and locates any patterns having the object a in that column. Each such pattern is then given a count of 1. Next the system searches the second column for all patterns having a b in that column. Again, a count is incremented for each pattern having a b in the second column. Finally, a search is made for all patterns having a y in the third column and a count is incremented for each such pattern. As a result, all fully matching patterns over the three-object sample have a count of 3 and those matching in only two columns have a count of 2. Only those patterns would be considered matching in this example. Only a predetermined number Q of nearest matches are returned for an input pattern. As an alternative to a binary search, a hash table may be used.

A prediction is then made from the remaining objects of each matching pattern, that is, the suffix. The prediction is ordered by the order of expected occurrence, with alternatives given for each occurrence. The alternatives for each occurrence are ordered by match and then by accuracy as determined in prior training sessions. Alternatively, they may be ordered first by accuracy. In this example, there is no direct match so the first alternatives of the prediction are ordered d o q according to accuracy of the patterns. The alternatives for the next occurrence are e p f and so on. By avoiding duplicate predictions, a full prediction of doq epf v rs hp it is obtained.

All alternatives from a column are marked by a time mark 0 or 1. The time marks are alternated between occurrences within a prefetch and between the tail and subsequent head of successive prefetches.

Figure 5:
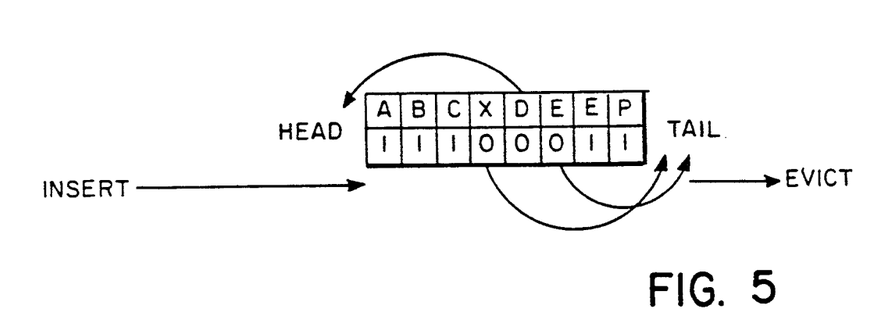
FIG. 5 illustrates changes in order of the ROT priority list with demands and prefetches.

FIG. 5 illustrates ordering of objects within the ROT to establish the replacement order. All evictions are from the tail of the list. All prefetched items are inserted into the head of the list. Thus, the prefetched objects initially have highest priority due to a highest expectation of being next used. When an object is referenced by an application program it is moved to the head of the list. As illustrated, object d is referenced and thus moved forward. At the same time, any contiguous prefetches which bear the same time mark, i.e., X and E, are moved to the tail of the list for early eviction. Those prefetches were made as alternatives to the selected object and are thus now considered to be the least likely to be referenced.

Figure 6:
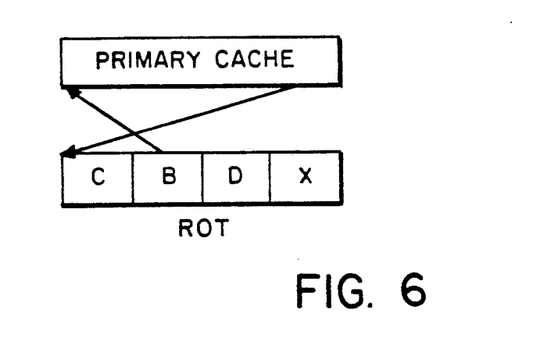
FIG. 6 illustrates cooperation between the predictive cache subsystem and a primary cache.

FIG. 6 illustrates how the present predictive cache may underlie a primary cache. The primary cache would follow its own rules. Any reads from that primary cache are applied to the predictive cache. Hopefully, the requested object will have been predicted and prefetched and thus reside in the predictive cache. Since the objects residing in both the primary and predictive cache reside in a common memory, an object may be moved from the predictive cache to the primary cache by merely exchanging pointers. The object which is evicted from the primary cache may be moved to the head of the predictive cache.

Figure 7A:
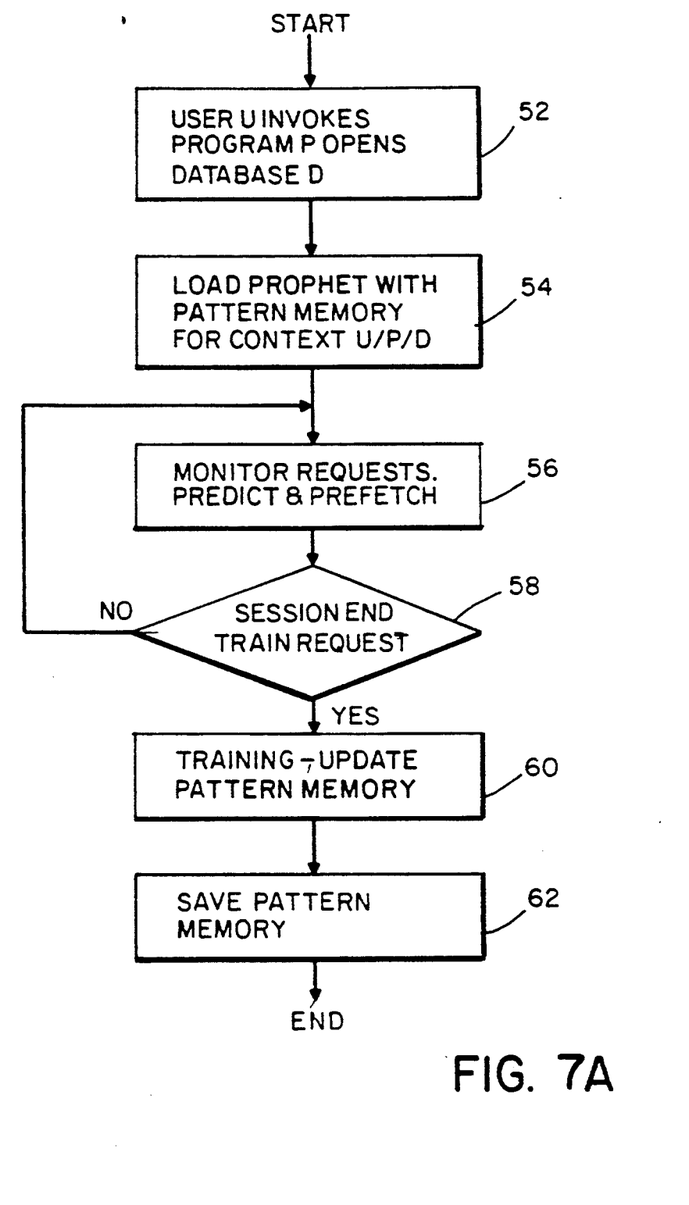
FIG. 7A is an overall flow chart of the predictive cache subsystem of the present invention.

A flow chart providing an overview of a specific software implementation of the present system is presented in FIG. 7A. At 52, a user U invokes a program P which opens a database D. At 54, the prophet module is loaded with a pattern memory for the context of user U, program P and database D. Thereafter, until the end of a session for that context at 58, the prophet module monitors requests and performs predictions to control prefetch at 56. After completion of a session, at step 60 the training portion of the prophet module reviews a trace of accesses made during step 56 to update the pattern memory for that context. The updated pattern memory is stored at 62.

Figure 7B:
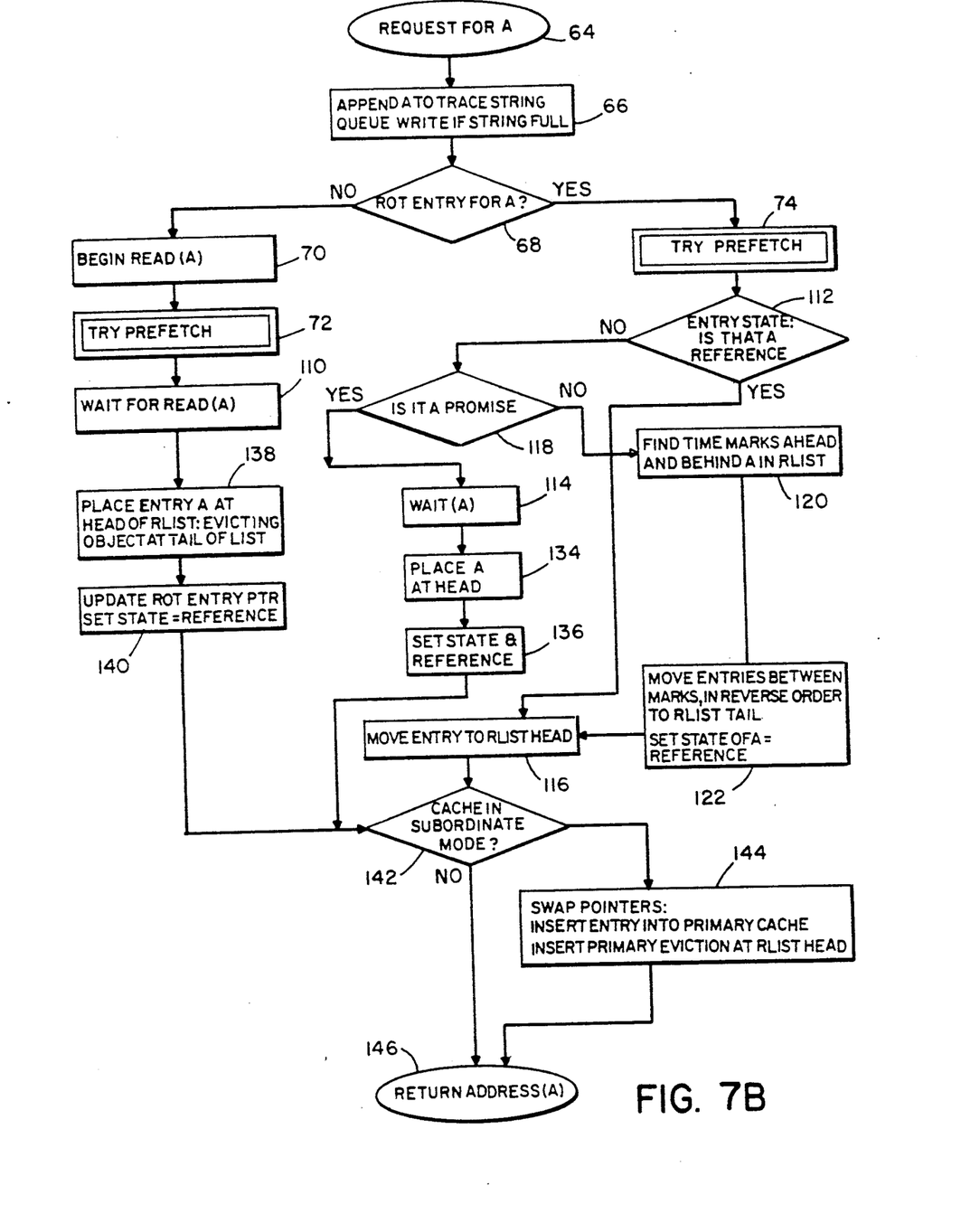
FIG. 7B is a flow chart of cache management in the predictive cache subsystem.

With each request for an object A during the step 56, the request is processed as illustrated in FIG. 7B. The object A is requested at 64 and that object is appended to a trace string for the session at 66. The trace is later used in training. If the trace string has exceeded the allotted memory space, the string is written to secondary storage. At 68 the resident object table is checked to determine whether the object is listed in the ROT. If not, the system immediately begins a read of A from secondary storage at 70. While the read is being processed by the server, the prophet considers at 72 the new request for A as the final object of a prefix to attempt a prediction and a prefetch. If at 68 an entry was found for object A, there is no need for a read of A from secondary storage, but a prefetch is still tried at 74.

Figure 7C:
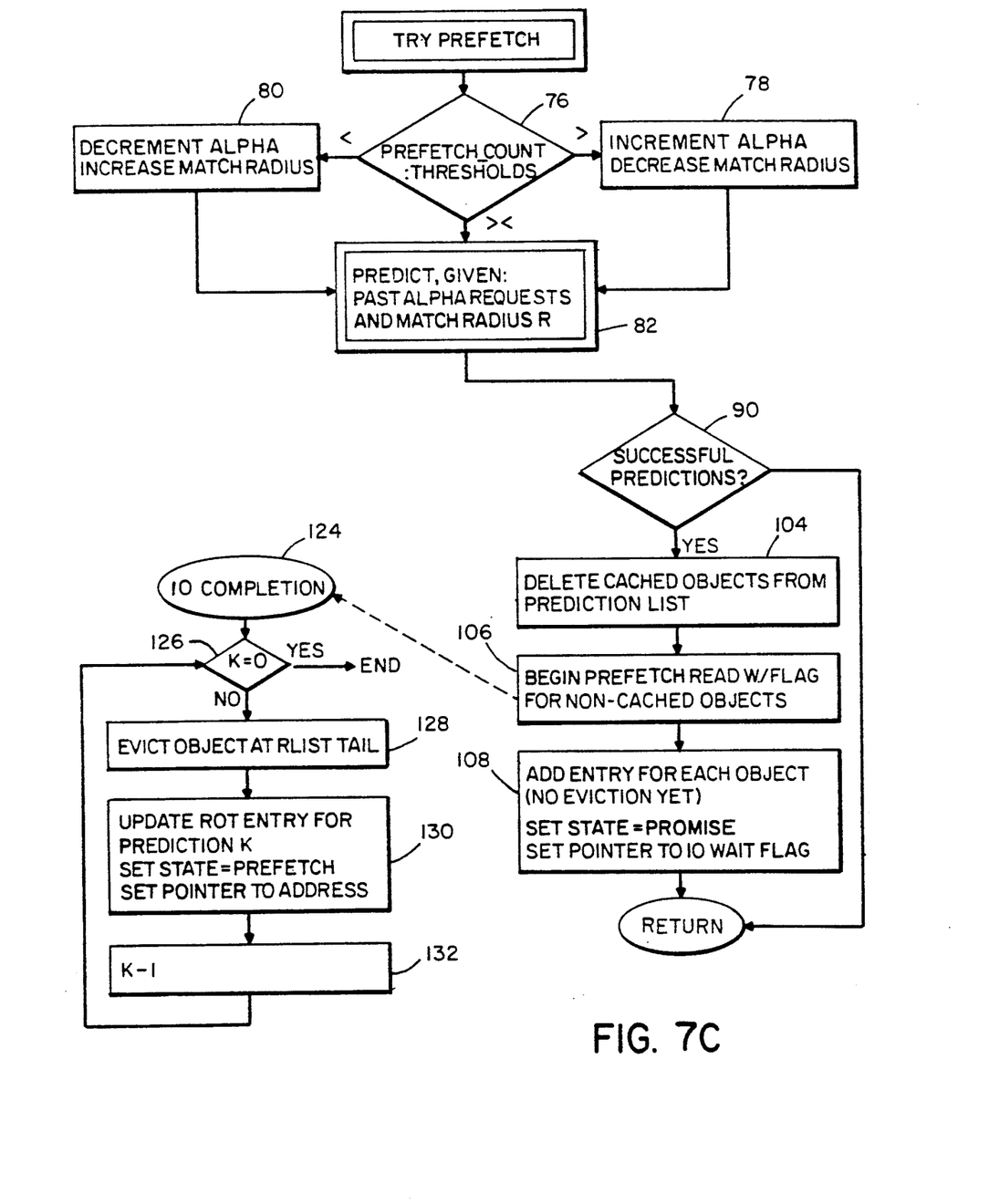
FIG. 7C is a flow chart of the prefetch generation within the cache management flow chart of FIG. 7B.

The try prefetch routine is illustrated in FIG. 7C. At 76 an indication of the hit rate of the ongoing session is compared to a threshold. The system may maintain a count of correct predictions relative to total number of prefetches or it may simply measure the number of unused prefetches then in cache memory. If too many unused prefetches reside in cache memory, the prediction process is considered inefficient. To increase efficiency and thus accuracy of predictions, the size of the sample window alpha is increased as the match radius R is decreased. As a result, a larger portion of the unit pattern must match the sample in order to be used in a prediction and fewer objects are predicted. On the other hand, if the number of unused prefetches in cache memory is less than a threshold, it may be considered that not enough risk is being taken by the system in generating predictions and prefetches. Thus, alpha is decreased and the match radius in increased at 80. If the prefetch count is within the thresholds at 76, or after alpha and R are adjusted at 78 and 80, the system attempts a prediction based on the most recent request using the match radius R at 82.

Figure 7D:
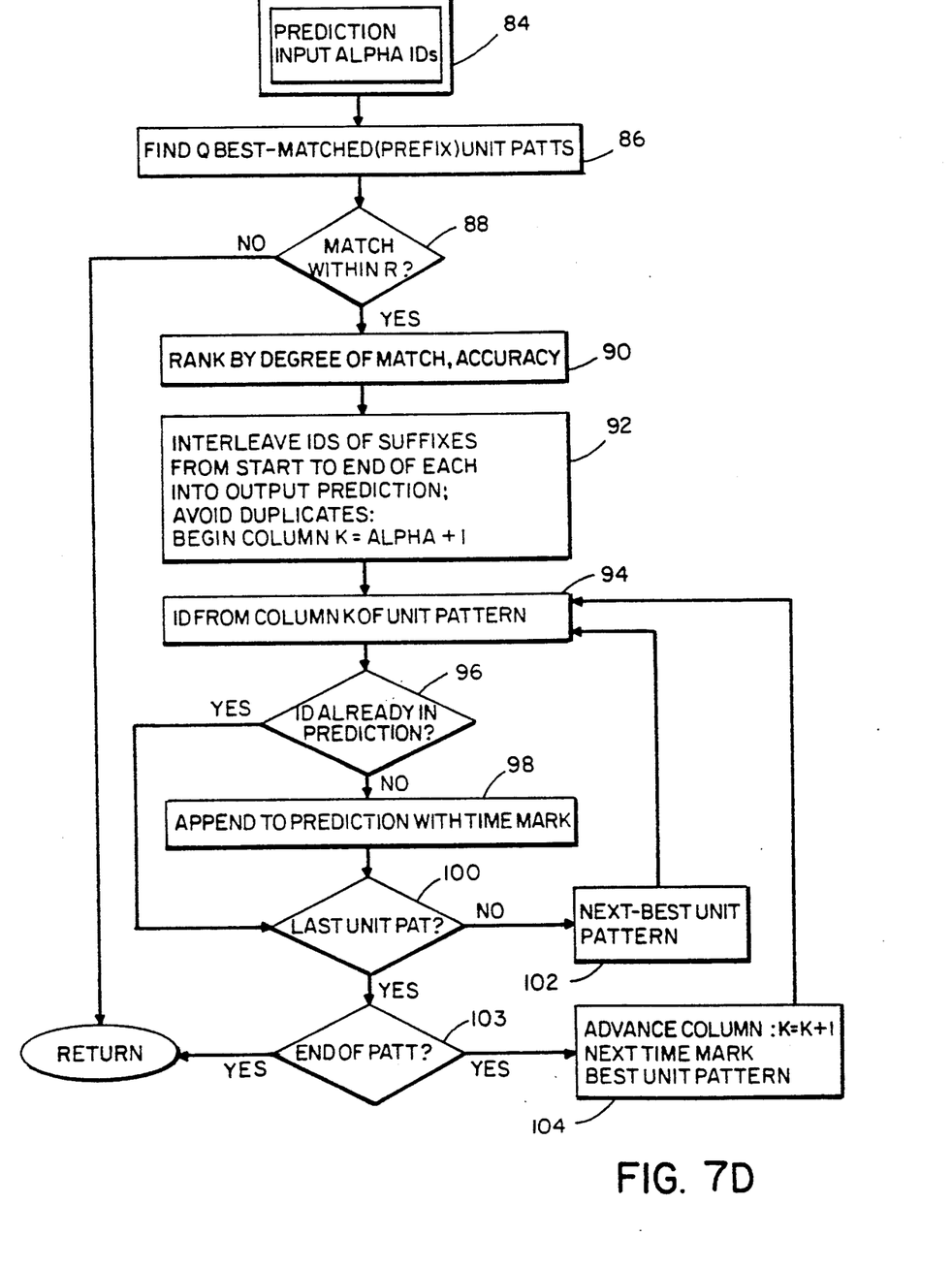
FIG. 7D is a flow chart of the prediction routines within the prefetch generation of FIG. 7C.

The prediction routine 82 is illustrated in FIG. 7D. Alpha object IDs, including the most recent object, are considered at 84. Using the binary search discussed above, the Q best matched unit patterns are selected at 86. Typically, Q is a value of 5-8. If no matches are found to be within the match radius R at 88, no prediction is made and the system returns through 90 in FIG. 7C to 72 or 74 in FIG. 7B. On the other hand, if at least one pattern does match within radius R at 88, the Q best matched unit patterns are ranked by degree of match and by accuracy at 90. Accuracy is established for each unit pattern during each training session and is thus an indication of the ratio of correct predictions to total predictions through prior sessions. With the unit patterns to be included in generating a prediction thus ranked, they are interleaved at 92 to create the full prediction. As discussed above with respect to FIG. 4, all objects from a column in pattern memory are selected and time marked. Then the next column of object identifiers are selected and time marked and so forth. To that end, beginning with the first column and the highest ranked unit pattern at 94, the object ID is compared to the pending prediction at 96 to determine whether it has already been included. If not, it is appended to the prediction with a time mark at 98. In either case, if the unit pattern is not the last unit pattern at 100, the system moves to the next ranked unit pattern at 102 and checks the object ID from the same column as before at 94. Once all IDs from that column of the ranked unit patterns have been checked and predictions made with a common time mark, the system determines at 103 whether the last column has been checked. If not, the column is advanced by one, the time mark is changed and the system returns to the highest priority pattern at 104. Again, all object IDs of that column are checked and added to the prediction with a time mark. This process continues until all columns have been checked for all patterns and the system returns from 102 to the prefetch routine at 82 in FIG. 7C.

At 104, the prediction list is checked against the cached objects and any already identified as residing in or promised in cache are deleted from the prediction list. A prefetch read 106 is then initiated for all objects remaining on the prediction list. Finally, an entry is added to the ROT for each prefetched object at 108, though no object is evicted at this time. The state for each such object is set to promise and the pointer for each is set to the I/O wait flag.

The system then returns to 72 or 74 in FIG. 7B. If a read for the requested object A had been initiated at 70 because the object had not been found in the ROT, the system then waits on the I/O wait flag at 110. When the requested object is received, it is placed at the head of the replacement list as an object is evicted from the tail of the list at 138. The ROT is updated to include a pointer to the object's address in cache memory and its state is set to referenced.

If the requested object A had been listed in the ROT at 68, the system checks at 112 whether the state of the entry was that of referenced object. If so, the object is moved to the head of the replacement list at 116.

If the object was not previously referenced, the system checks at 118 whether the entry state is that of a promise. If it is a promise, the system must wait for the returned A at 114, the object having been requested in a prior prefetch. The wait at 114 for the object A is ended with an I/O completion illustrated from 124 in FIG. 7C. K is the number of prefetched objects being returned with the I/O completion. K is checked at the beginning of the loop at 126. The object at the tail of the replacement list is evicted at 128. The prefetched object of lowest priority, that is at the tail of the prediction, is entered at the head of the ROT replacement list. Its state is set to prefetch and its pointer is set to an address in cache memory at 130. K is then decremented at 132 and again checked at 126. The loop continues until all objects received with the I/O completion are entered at the head of the ROT. After completion of this loop for all objects, the tail of the prediction is positioned toward the tail of the ROT replacement list. Thus, the prefetched object identifiers are listed in the ROT by order of likelihood of access. After time in cache, with failure to access prefetched objects, the objects of initial least likelihood of access in the prediction are evicted first.

With the prefetch I/O complete, the requested object A is then moved to the head of the replacement list by modifying the link next and link back pointers at 134 and its state is set to referenced at 136.

If the object was listed in the ROT at 68, was not previously referenced at 112 and was not a promise at 118, it is available in cache memory as a prefetch. Before moving the entry to the head of the list at 116, it must be determined whether the object was in cache memory with alternatives. Object IDs having the same time mark and contiguous with the requested object are located at 120. Such IDs are for prefetched alternatives whose access was expected at the time of access of A. Those objects are are moved to the tail of the replacement list at 122 The state of the object A is set to referenced.

As illustrated in FIG. 6, the system may operate in a subordinate mode to a primary cache. That subordinate mode is determined at 142. If it is operating in a subordinate mode, pointers in the primary cache and the predictive cache are swapped. Thus, the requested object is placed in the primary cache according to the rules of that cache. The object which is evicted from the primary cache according to its rules is inserted at the head of the replacement list in the prediction cache ROT at 144.

The address from the pointer field of the primary ROT is returned to the application program at 146 to complete the cache management sequence.

Figure 7E:
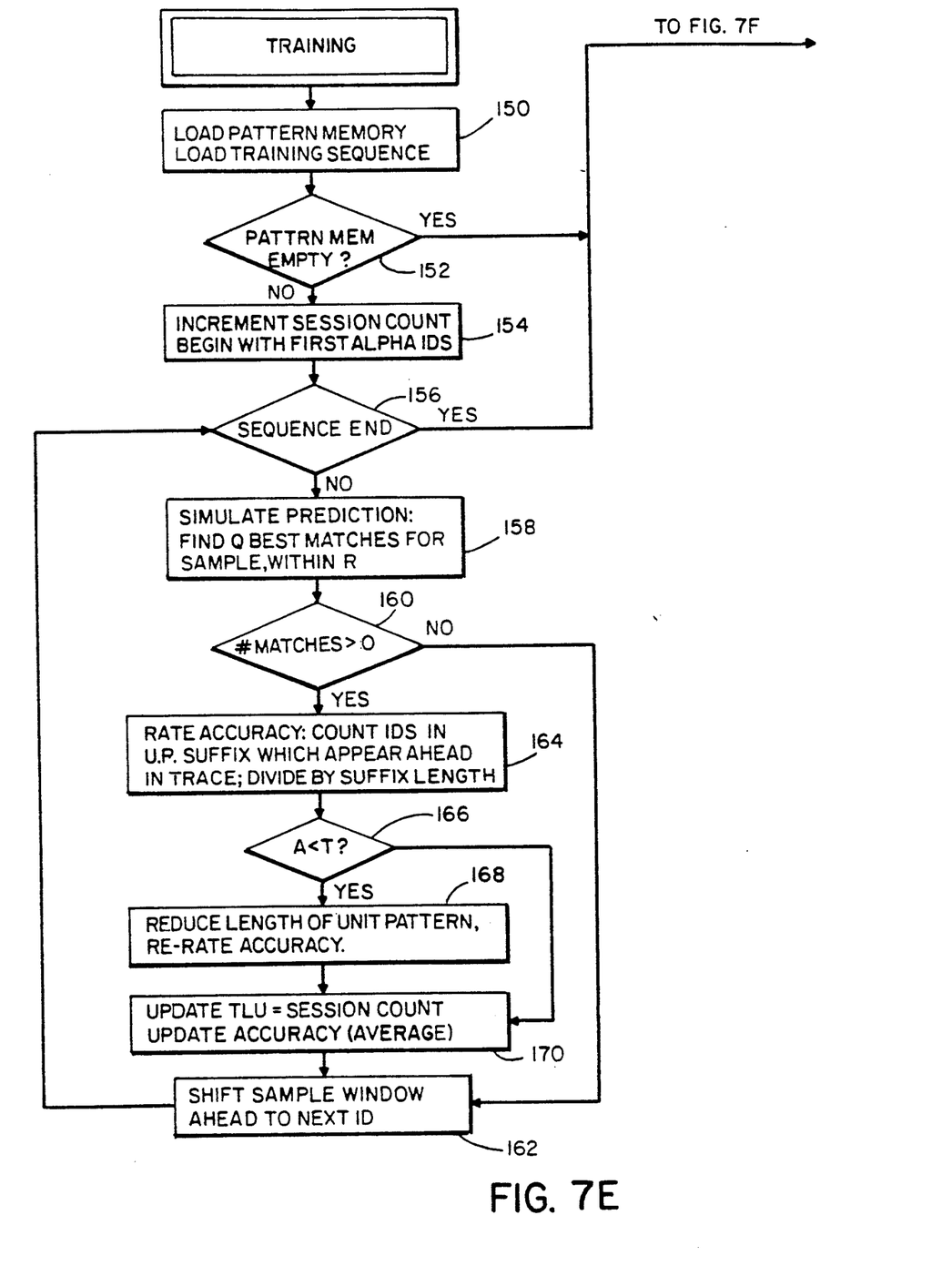
FIGS. 7E and 7F are together a flow chart of the training routines in the flow chart of FIG. 7A.

The above sequence is performed with each request for an object by the application program during a session. At the end of a session, or at any appropriate time when the workstation processor is not busy, the training routine of FIG. 7A is performed. The training routine is illustrated in detail in FIGS. 7E and 7F.

At 150, the pattern memory for that context is loaded and the access trace from the prior session is loaded. If the pattern memory is empty at 152, the system moves to the sequence of FIG. 7F to generate new patterns. If patterns already reside in pattern memory for that context, the system continues the sequence of FIG. 7E. At 154, the system increments the session number and then begins with the first alpha object IDs of the trace. Typically, alpha is initially set at 3 but it may increase and decrease throughout the sequence. At 156, the system checks to determine whether the training trace has been completed. If not, a prediction is simulated at 158 for the alpha object IDs then being considered. The Q best matches for the sample within radius R are determined. This simulation procedure is substantially the same as during the actual prediction routine during cache management but no attempt is made to interleave patterns to create a prefetch prediction.

At 160 it is determined whether any matches were found in step 158. If not, the sample window is shifted ahead on the trace by one object ID at 162 and the loop is repeated. If a match is found, accuracy of each unit pattern prediction is computed at 164. For each unit pattern, the number of objects in the suffix of the pattern which also appear in the corresponding following objects of the trace are divided by the suffix length to provide an accuracy A for that occurrence of the unit pattern. At 166 the computed accuracy is compared to a threshold T. If the accuracy is less than the threshold, the length of the unit pattern is reduced by one object at 168. Because fewer predictions are made, this action offers the possibility of increasing accuracy. Accuracy is also rerated in view of the reduction in length. Regardless of whether the unit pattern is reduced in length, its corresponding time last used (TLU) time stamp in the pattern memory of FIG. 4 is updated. Also, the average accuracy over this and prior sessions is computed at 170.

Once the system has sequenced through the entire session trace to shorten unit patterns and upgrade statistics regarding unit patterns presently in pattern memory, the system moves on from 156 to generate new unit patterns. At 172 in FIG. 7F alpha is reset to equal the unit pattern maximum size k. Alpha equal to k then serves as a window which is sequenced through the session trace. In the following training sequence at each position of the window, the system locates regions of the trace with no matches within radius R in pattern memory and in those regions defines new unit patterns with initial accuracy of one.

Figure 7F:
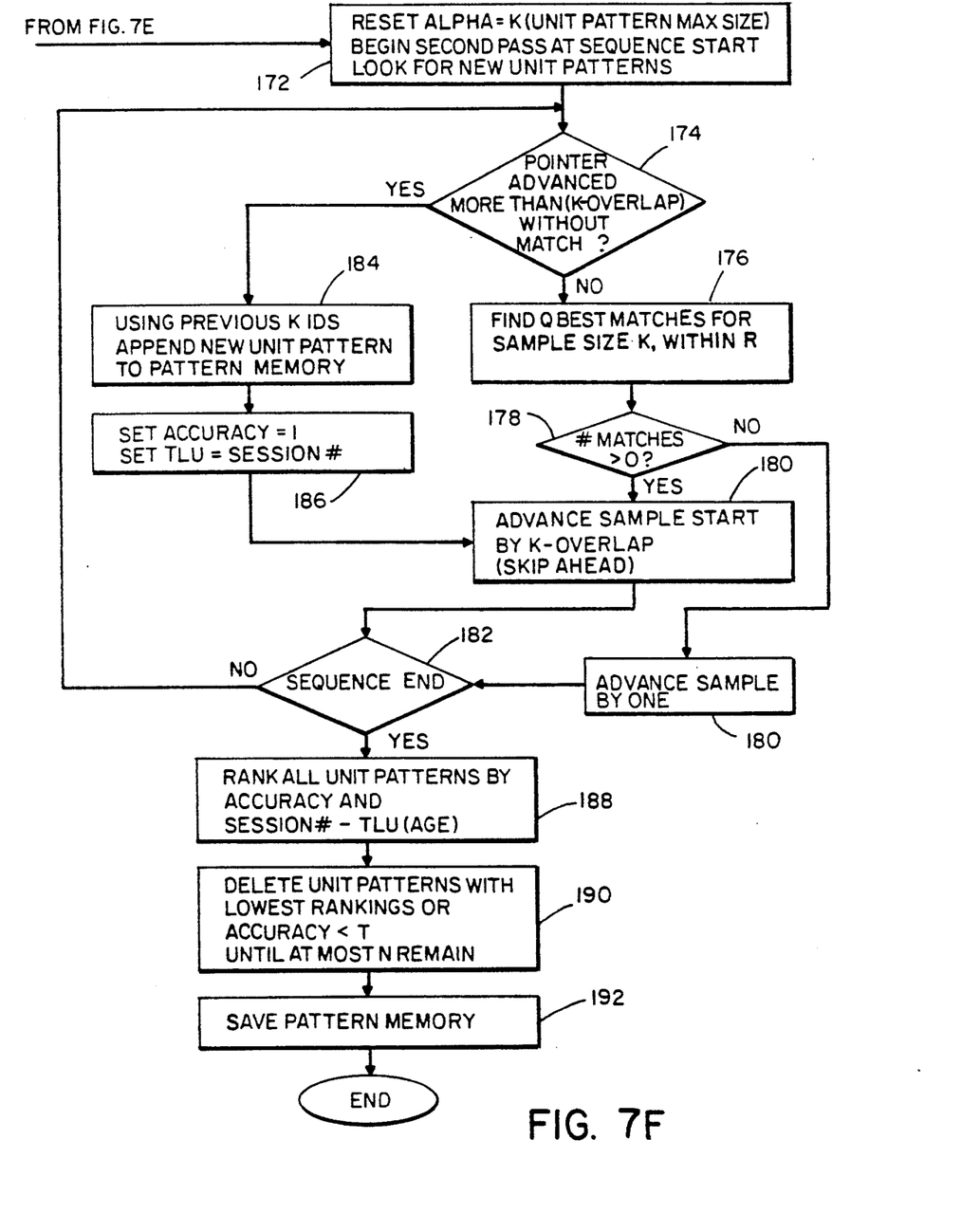

If at 174 it is determined that the system has stepped through k locations of the window without a match, the system uses the previous k object IDs as a new pattern which is appended to pattern memory at 184. The accuracy for the new unit pattern is set equal to 1 and the time last used is set to the last session number at 186. The system skips forward by (k - overlap) objects.

If at 174 the system has shifted the window less than K times without a match, the system proceeds to step 176. There, the system looks for best matches for the full unit pattern sample size k within a radius R of, for example, k/2. If no such matches are determined at 178, the system advances by one sample at 180 and loops back from 182 to determine whether the window has advanced k objects without such a match. If a match is determined at 178, the system skips the window ahead by k objects at 180 and loops back at 182.

Once the system sequences through the entire trace, all unit patterns now in pattern memory are ranked by accuracy and session number at 188. In a preferred implementation, patterns are ranked by accuracy and age by the formula:

$$\text{Ranking Value} = \frac{\text{accuracy} + \frac{1}{\text{age}}}{2}$$

At 190, any patterns of accuracy less than the threshold T are deleted. To the extent required to limit the number of unit patterns to a value n, those of the lowest ranking are then deleted. The new pattern memory is then saved in secondary storage at 192.

Many methods exist that may be implemented to provide the mechanism for learning an access pattern in order to predict accesses. In general, pattern recognition methods provide some means of matching an input against a set of previously encountered instances. Patter learning algorithms typically identify parts of the input instances that reoccur, or that constitute prominent features of the pattern. Any representation of only the prominent features of a signal is inherently a compression of the signal, and implies a generalization of the observed inputs. One distinction between these models is whether learning is "lossy" or "lossless". A lossless algorithm is one that can perfectly recover the original inputs, while a lossy algorithm permits approximation, sacrificing detail for representational efficiency.

One implementation relies on an associative memory for learning and prediction. An associative memory retrieves stored data when presented with similar data. This behavior is also known as content-addressable memory. Typically, a metric is provided to indicate the degree of similarity between an input and the contents of the associative memory. Similarity is often measured along multiple dimensions, hence similarity metrics can be expressed using a geometric model, where patterns occupy relative points in pattern space, and similar patterns are "near". Retrieving data from such a memory is a matter of finding the nearest neighbors to an input. The degree of acceptable similarity during retrieval is controlled by specifying a radius. Only stored items inside the radius of similarity around the input are retrieved. Radius is also used to define groupings, or classifications, or similar stored patterns. Many methods exist for automatically identifying groups of patterns to form classes and for deriving "most typical" examples of patterns in a class. The associative memory models most useful for the current predictive cache implementation are those of Cooper (U.S. Pat. No. 4,326,259) and Potter (U.S. patent application Ser. No. 156,542). Potter's associative memory uses parallel hardware, enabling fast searches over very large pattern spaces.

A large body of research exists on machine learning and neural network technology. While the power and application of the various techniques differs, many can be used for prediction. The most popular neural network model is back propagation.

A further body of work applicable to the task of learning to predict access patterns is found in statistics. Parametric and non parametric methods such as primary component analysis operate on pattern information stored in matrix form to extract the statistically most prominent components of an input data set. Theoretical work in the general area of machine learning, particularly on the learnability of different classes of functions from examples values, may be applicable. Other applicable statistical techniques include clustering, energy minimization, Boltzmann machines, and data compression techniques.

While this invention has been particularly shown and described with reference to preferred embodiments thereof, it will be understood by those skilled in the art that various changes in form and details may be made therein without departing from the spirit and scope of the invention as defined by the appended claims. For example, the present invention can be applied to relational data bases and to memory management within an operating system.

I claim:

1. A data processing system including a predictive cache memory subsystem comprising:
    a cache memory for storing objects retrieved from secondary memory;
    pattern memory storing object access patterns generated from prior accesses of the data processing system processing in a like context;
    a prefetcher responsive to a current access pattern during operation of the data processing system for predicting, from like object access patterns stored in pattern memory, accesses to objects and for prefetching predicted objects to store the predicted objects in cache memory.

2. A data processing system as claimed in claim 1 further comprising a trainer for generating access patterns stored in pattern memory from traces of accesses recorded during processing of the data processing system.

3. A data processing system as claimed in claim 2 wherein the trainer generates statistical information for the stored access patterns which indicates ability of individual patterns to contribute to system speedup.

4. A data processing system as claimed in claim 3 wherein the patterns stored in pattern memory are stored as unit patterns and the trainer deletes or reduces lengths of unit patterns in pattern memory based on accuracy of predictions generated by the unit patterns.

5. A data processing system as claimed in claim 3 wherein the statistics include accuracy of prediction.

6. A data processing system as claimed in claim 2 wherein the trainer adapts to accesses of the data processing system to delete patterns from pattern memory which do not contribute sufficiently to system speedup.

7. A data processing system as claimed in claim 2 wherein the trainer initiates patterns in pattern memory from a single occurrence of a pattern in an access trace.

8. A data processing system as claimed in claim 7 wherein the trainer initiates patterns from overlapping input patterns in an access trace.

9. A data processing system as claimed in claim 1 wherein the patterns are stored in pattern memory as unit patterns ordered by predicted time of access and the prefetcher compares a current access pattern to a sample length of unit patterns to form a prediction from a remaining length of the unit patterns.

10. A data processing system as claimed in claim 9 wherein the prefetcher dynamically controls sample length to balance the efficiency of prediction against accuracy.

11. A data processing system as claimed in claim 1 wherein the prefetcher compares a current access pattern to a sample length of patterns stored in pattern memory and the prefetcher dynamically controls sample length to balance efficiency of prediction against accuracy.

12. A data processing system as claimed in claim 1 wherein the prefetcher controls lengths of predicted object accesses to balance efficiency of prediction against accuracy.

13. A data processing system as claimed in claim 1 wherein the prefetcher controls radius of match of patterns to balance efficiency of prediction against accuracy.

14. A data processing system as claimed in claim 1 wherein the pattern memory stores separate sets of patterns for different contexts of processing.

15. A data processing system as claimed in claim 14 wherein access patterns stored in pattern memory are identified by context including user, application and database.

16. A data processing system as claimed in claim 14 wherein context is specified by a user or application.

17. A data processing system as claimed in claim 1 wherein the prefetcher predicts objects from a combination of access patterns stored in pattern memory.

18. A data processing system as claimed in claim 1 wherein the cache memory subsystem evicts objects from cache memory by order of priority and the prefetcher gives objects which are prefetched priority within the prefetch according to predicted time of access.

19. A data processing system as claimed in claim 18 wherein prefetched objects are initially given high priority to remain in cache memory.

20. A data processing system as claimed in claim 13 wherein the prefetcher predicts and orders predicted objects, with alternatives at predicted times of access.

21. A data processing system as claimed in claim 20 wherein the prefetcher orders alternatives by degree of match of a current access pattern to a stored access pattern.

22. A data processing system as claimed in claim 21 wherein the prefetcher orders alternatives by accuracy of past predictions for the stored access patterns.

23. A data processing system as claimed in claim 20 wherein the prefetcher orders alternatives by accuracy of past predictions for the stored access patterns.

24. A data processing system as claimed in claim 20 wherein, when a prefetched an object is used, the used object is given high priority and alternatives to the used object are given low priority.

25. A data processing system as claimed in claim 18 further comprising a primary cache which receives objects from the predictive cache memory subsystem and which evicts objects to the predictive cache memory subsystem.

26. A data processing system as claimed in claim 18 wherein replacement order is determined by a list of objects residing in cache memory.

27. A data processing system as claimed in claim 1 wherein the prefetcher predicts objects based on the time of access order of objects within a current access pattern relative to a stored access pattern.

28. A data processing system including a predictive cache memory subsystem comprising:
   a cache memory for storing objects retrieved from secondary memory;
   pattern memory storing separate sets of object access patterns generated from prior accesses of the data processing system processing in different contexts;
   a prefetcher responsive to a current access pattern during operation of the data processing system for predicting, from like object access patterns stored in pattern memory, accesses to objects and for prefetching predicted objects to store the predicted objects in cache memory, the prefetcher comparing the time of access order of a current access pattern to a sample length of patterns to form a prediction from a remaining length of selected patterns, the remaining length of the selected patterns being dynamically controlled to increase the efficiency of prediction, predictions being made from combinations of access patterns stored in pattern memory; and
   a trainer for generating access patterns stored in pattern memory from traces of accesses recorded during processing of the data processing system, the trainer generating statistical information for the stored accessed patterns including accuracy of prediction and deleting patterns of insufficient accuracy from pattern memory.

29. A data processing system as claimed in claim 28 wherein the cache memory subsystem evicts objects from cache memory by order of priority and objects which are prefetched are given priority within the prefetch by the prefetcher and are initially given high priority to remain in cache memory, predicted objects being ordered by the prefetcher by order of expected time of access, with alternatives at expected times of access, alternatives being ordered by degree of match of the current access pattern to a stored access pattern and by accuracy of past predictions for the stored accessed patterns.

30. A method of cache memory management comprising:
generating access patterns from traces of object accesses recorded during processing of a data processing system in a context;
storing the access patterns;
monitoring a current access pattern during operation of the data processing system and predicting, from stored object access patterns from a like context, accesses to objects; and
prefetching predicted objects and storing the predicted objects in cache memory.

31. A method as recited in claim 30 further comprising generating statistical information for the stored access patterns which indicates ability of pattern to contribute to system speedup.

32. A method as recited in claim 30 wherein the access patterns are stored as unit patterns and predicted objects are predicted by comparing a current access pattern to a sample length of unit patterns ordered by time of access to form a prediction from a remaining length of selected unit patterns.

33. A method as recited in claim 30 further comprising dynamically controlling sample length to balance efficiency of prediction against accuracy.

34. A method as claimed in claim 30 further comprising dynamically controlling lengths of predicted object accesses to balance efficiency against accuracy.

35. A method as recited in claim 30 further comprising storing separate sets of patterns for different contexts of processing.

36. A method as recited in claim 30 further comprising predicting objects from a combination of access patterns stored in pattern memory.

37. A method as recited in claim 30 further comprising evicting objects from cache memory by order of priority, giving order of priority within a prefetch according to predicted time of access, and initially giving prefetched objects high priority to remain in cache memory.

38. A method as recited in claim 37 further comprising predicting and ordering objects with alternatives at predicted times of access.

39. A method as recited in claim 38 wherein alternatives are predicted by degree of match of a current access pattern to a stored access pattern.

40. A method as recited in claim 38 wherein alternatives are ordered by accuracy of past predictions for the stored accessed patterns.

41. A method as recited in claim 30 comprising predicting objects based on the time of access order of objects within a current access pattern relative to a stored access pattern.

* * * * *